US011131995B2

(12) United States Patent
Richardson, Jr. et al.

(10) Patent No.: US 11,131,995 B2
(45) Date of Patent: Sep. 28, 2021

(54) AUTONOMOUS AQUATIC HERBICIDE APPLICATION

(71) Applicant: North Carolina State University, Raleigh, NC (US)

(72) Inventors: Robert Jeryl Richardson, Jr., Fuquay Varina, NC (US); Steve Thomas Hoyle, Kittrell, NC (US); Justin Jerome Nawrocki, Holly Springs, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 15/763,144

(22) PCT Filed: Oct. 7, 2016

(86) PCT No.: PCT/US2016/055986
§ 371 (c)(1),
(2) Date: Mar. 26, 2018

(87) PCT Pub. No.: WO2017/062764
PCT Pub. Date: Apr. 13, 2017

(65) Prior Publication Data
US 2018/0275660 A1 Sep. 27, 2018

Related U.S. Application Data

(60) Provisional application No. 62/239,519, filed on Oct. 9, 2015.

(51) Int. Cl.
*G05D 1/02* (2020.01)
*A01M 7/00* (2006.01)
(Continued)

(52) U.S. Cl.
CPC ......... *G05D 1/0206* (2013.01); *A01M 7/0089* (2013.01); *A01M 21/043* (2013.01);
(Continued)

(58) Field of Classification Search
CPC ...... G05D 1/0206; B63H 25/04; B63B 35/00; B63B 2035/007; G01C 21/203; A01M 7/0089; A01M 21/043
See application file for complete search history.

(56) References Cited

U.S. PATENT DOCUMENTS 4,799,459 A 1/1989 Yi-Tung
5,089,120 A 2/1992 Eberhardt
(Continued)

FOREIGN PATENT DOCUMENTS

KR WO2013/100228 * 9/2012 ............ B63B 35/00

OTHER PUBLICATIONS

International Search Report for PCT/US2016/055986 dated Dec. 30, 2016.

*Primary Examiner* — Qingzhang Zhou
(74) *Attorney, Agent, or Firm* — Thomas | Horstemeyer, LLP

(57) ABSTRACT

Various autonomous aquatic herbicide application vessels are described. In one embodiment, a system for aquatic herbicide application includes an aquatic vessel, a propulsion system to propel the aquatic vessel over a body of water, a holding container to hold a substance, a substance applicator to apply the substance to the body of water, and a controller. The controller can include a control processor configured to navigate the aquatic vessel using the propulsion system and apply the substance to the body of water using the substance applicator. According to one embodiment, the system includes a global positioning system to determine a geographic location of the system and a memory to store a route for application of the substance in the body of water. Further, the controller is configured to autono- (Continued)

mously control the propulsion system to track the route based on changes in the geographic location of the system over time.

20 Claims, 5 Drawing Sheets

(51) Int. Cl.
  *A01M 21/04*    (2006.01)
  *G01C 21/20*    (2006.01)
  *B63B 35/00*    (2020.01)
  *B63H 25/04*    (2006.01)

(52) U.S. Cl.
  CPC ............ *B63B 35/00* (2013.01); *B63H 25/04* (2013.01); *G01C 21/203* (2013.01); *B63B 2035/007* (2013.01)

(56) References Cited

U.S. PATENT DOCUMENTS

| | | | |
|---|---|---|---|
| 5,787,832 A * | 8/1998 | Spinka | B63B 43/14 |
| | | | 114/122 |
| 6,269,763 B1 | 8/2001 | Woodland | |
| 6,778,887 B2 * | 8/2004 | Britton | A01M 7/0089 |
| | | | 210/198.1 |
| 7,789,723 B2 * | 9/2010 | Dane | B63B 35/00 |
| | | | 440/6 |
| 8,031,086 B2 | 10/2011 | Thacher et al. | |
| 8,205,570 B1 | 6/2012 | Tureaud et al. | |
| 8,825,241 B2 * | 9/2014 | Hine | B63B 35/00 |
| | | | 701/21 |
| 2007/0084813 A1 | 4/2007 | Morath | |
| 2014/0284998 A1 * | 9/2014 | Brennan | B63B 35/00 |
| | | | 307/9.1 |
| 2015/0259033 A1 | 9/2015 | George et al. | |

\* cited by examiner

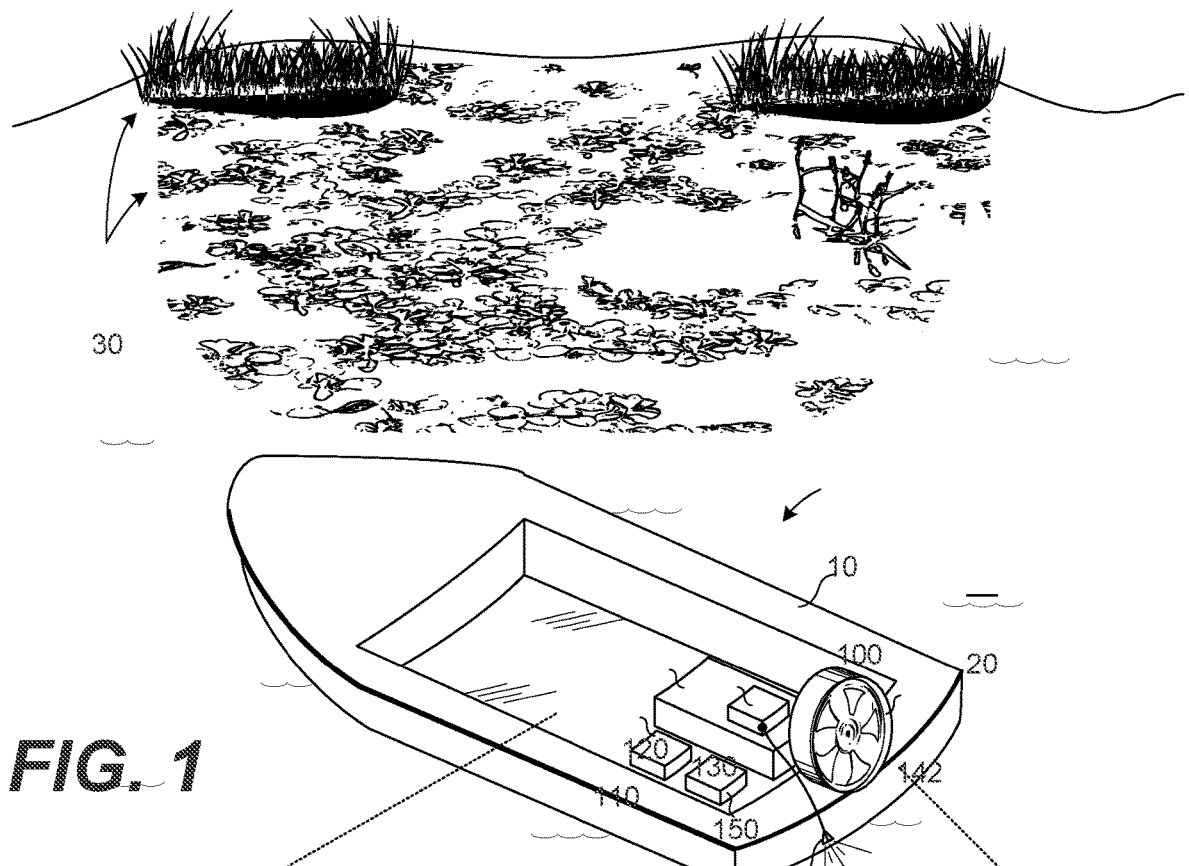
FIG. 1
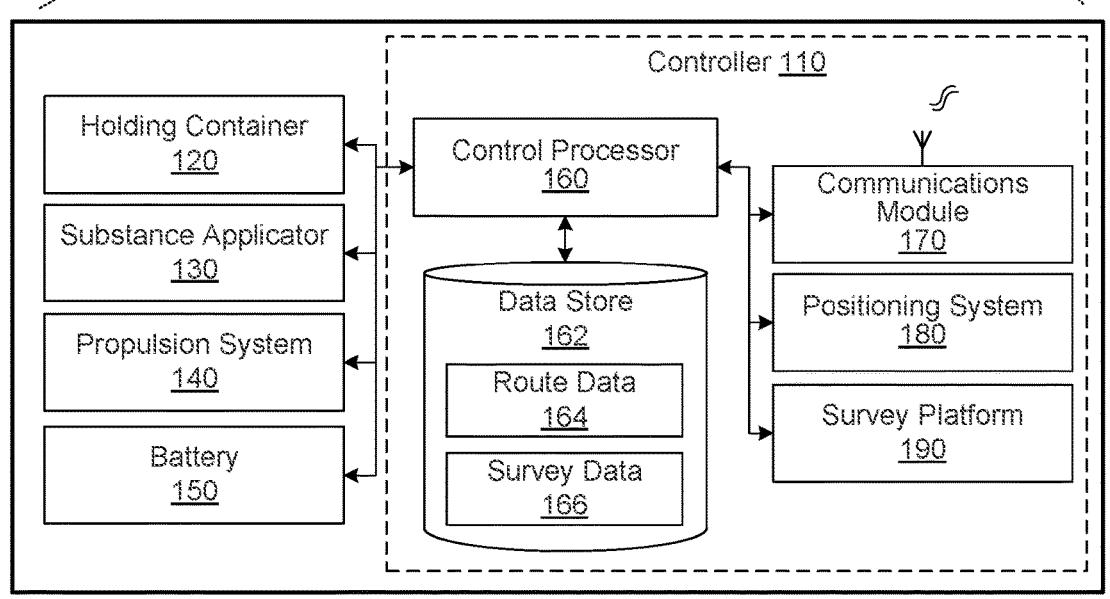

AUTONOMOUS AQUATIC HERBICIDE APPLICATION

CROSS-REFERENCE TO RELATED APPLICATIONS

This is the 35 U.S.C. § 371 national stage application of PCT Application No. PCT/US2016/055986, filed Oct. 7, 2016, where the PCT application claims the benefit of U.S. Provisional Application No. 62/239,519, filed Oct. 9, 2015, the entire contents of both of which applications are hereby incorporated herein by reference.

BACKGROUND

Various substances, such as aquatic herbicides, have been formulated for use in water to kill or control the growth of aquatic plants. Certain herbicides have been approved for aquatic use by the Environmental Protection Agency (EPA) when used according to label directions. Aquatic herbicides can be sprayed or spread directly onto floating or emergent aquatic plants in either a liquid or pellet form. Systemic herbicides are designed to kill aquatic plants. On the other hand, contact herbicides are designed to kill only the parts of the plant that contact the herbicide, leaving the roots alive and capable of regrowth. Non-selective, broad spectrum herbicides will generally affect all plants that they come into contact with. Selective herbicides, however, will affect only some plants. Both personal and environmental risks can arise from accidents and/or improper application of aquatic herbicides, and the application of aquatic herbicides is regulated in many states.

BRIEF DESCRIPTION OF THE DRAWINGS

For a more complete understanding of the embodiments and the advantages thereof, reference is now made to the following description, in conjunction with the accompanying figures briefly described as follows:

FIG. 1 illustrates an example autonomous aquatic herbicide application system according to an example embodiment described herein.

Figure 2:
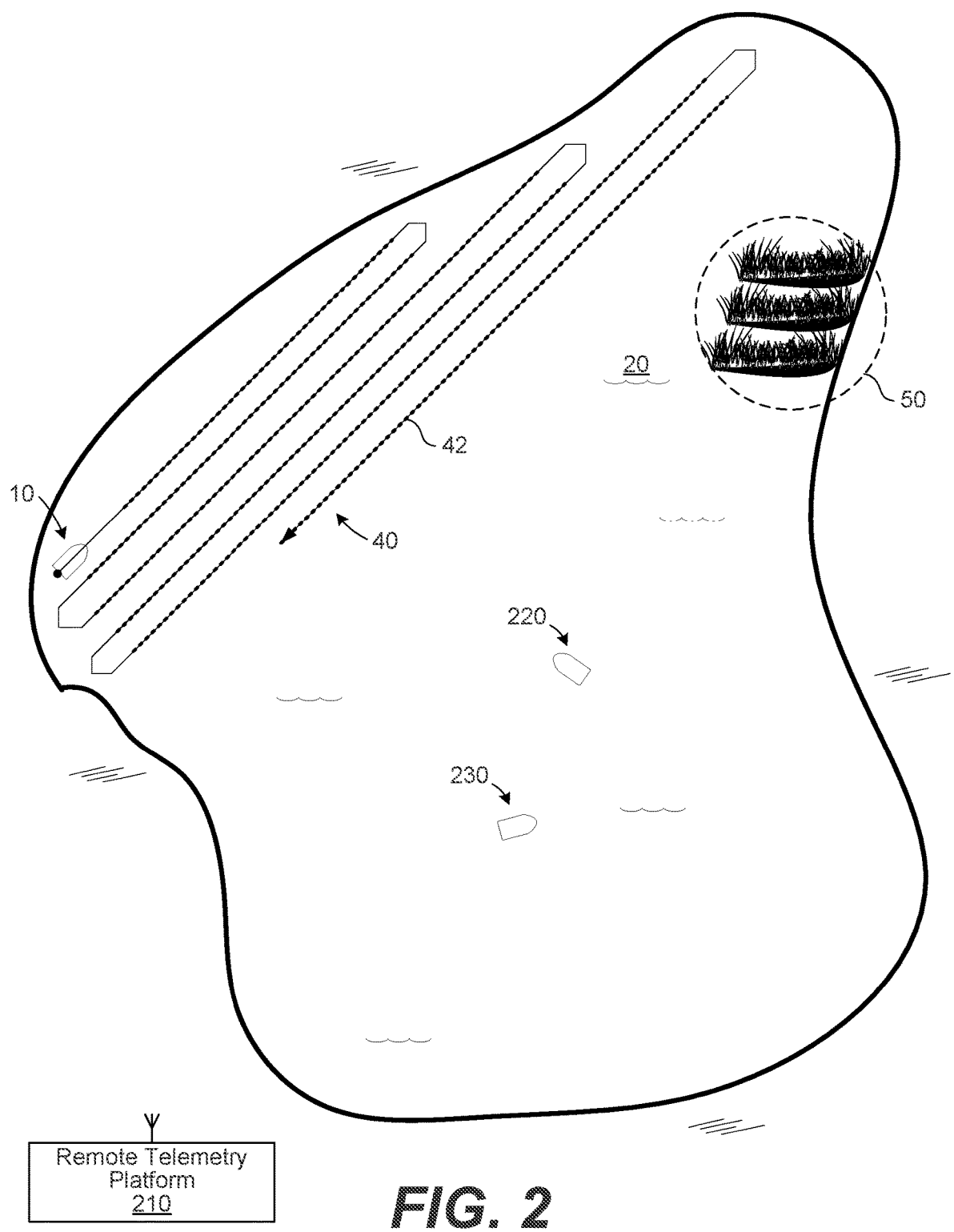
FIG. 2 illustrates a plan view of a route followed in a body of water by the autonomous aquatic herbicide application system shown in FIG. 1 according to an example embodiment described herein.

The drawings illustrate only example embodiments and are therefore not to be considered limiting of the scope of the embodiments described herein, as other embodiments are within the scope of this disclosure. The elements and features shown in the drawings are not necessarily drawn to scale, emphasis instead being placed upon clearly illustrating the principles of the embodiments. Additionally, certain dimensions or positionings may be exaggerated to help visually convey certain principles. In the drawings, similar reference numerals between figures designate like or corresponding, but not necessarily the same, elements.

DETAILED DESCRIPTION

The application of aquatic herbicides, for example, and other substances to bodies of water can be time consuming and present an inherent risk to water resource managers. For example, the application of aquatic herbicides carries the danger of exposure to concentrated herbicides for water resource managers, along with the risk of accidental drowning. In that context, various embodiments of autonomous aquatic herbicide application systems are described herein.

The use of an automatous or remote controlled aquatic herbicide application system, according to the embodiments described herein, allows operators to remain in a safe location and accomplish the operations needed to manage aquatic vegetation. In one embodiment, a system for aquatic herbicide application includes an aquatic vessel, a propulsion system to propel the aquatic vessel over a body of water, a holding container to hold a substance, a substance applicator to apply the substance to the body of water, and a controller. The controller can include a control processor configured to navigate the aquatic vessel using the propulsion system and apply the substance to the body of water using the substance applicator. According to one embodiment, the system includes a global positioning system to determine a geographic location of the system and a memory to store a route for application of the substance in the body of water. Further, the controller can be configured to autonomously control the propulsion system to track the route based on changes in the geographic location of the system over time.

According to other aspects of the embodiments, the system incorporates a modular design that facilitates easy changes to certain equipment carried by the aquatic vessel for vegetation management, communications, water surveying, etc. Additionally, various embodiments incorporate an outrigger platform to facilitate the application of substances to the body of water, survey the water, and improve the ability to collect data and/or apply herbicide effectively. Among other uses, the system can be used for vegetation management, communications, bathymetry determination, and vegetation and water chemistry measurement, surveying, and analysis.

Turning to the drawings, various embodiments and aspects of the embodiments are described in greater detail. FIG. 1 illustrates an example autonomous aquatic herbicide application system 10 ("the system 10") according to an example embodiment described herein. As shown in FIG. 1, the system 10 is located in a body of water 20, and various types of aquatic plants 30 grow in the water 20. Generally, the system 10 provides a platform by which a substance, such as an aquatic herbicide, can be applied to the body of water 20 to control the growth of the aquatic plants 30.

According to the example shown in FIG. 1, the system 10 includes an aquatic vessel 100, a controller 110, a holding container 120 to hold a substance, a substance applicator 130 to apply the substance to the body of water 20, a propulsion system 140 to propel the aquatic vessel 100 over the body of water 20, and a battery 150. The controller 110 includes a control processor 160 and a data store 162 that, among other data, stores route data 164 and survey data 166. The controller 110 further includes a communications module 170, a positioning system 180, and a survey platform 190.

The aquatic vessel 100 can be formed from any suitable material into any shape that is buoyant in the body of water 20. For example, the aquatic vessel 100 can be formed from wood, fiberglass, glass, plastic, foam, other suitable materials, and combinations thereof. The aquatic vessel 100 can be formed into any shape and size. Depending upon the equipment being carried by the aquatic vessel 100, it should be large enough to carry the controller 110, holding container 120, substance applicator 130, propulsion system 140, battery 150, etc.

The controller 110 can be embodied as an embedded or general-purpose processor(s), processing circuitry, computing device(s), or computing system(s) configured to control the operations of the system 10. In that context, as described in further detail below with reference to FIG. 5, the control processor 160 of the controller 110 can be embodied, at least in part, by a processor that executes computer-readable instructions. According to the execution of the instructions, the controller 110 can be directed or configured to control the propulsion system 140 to navigate the aquatic vessel 100 over the body of water 20. The controller 110 can also be configured to control the operations of the substance applicator 130 to apply the substance stored in the holding container 120 to the body of water 20. Further, the controller 110 can be configured to survey the body of water 20 using the survey platform 190, store data associated with the survey as the survey data 166 in the data store 162, and wirelessly transmit the data to a remote telemetry platform using the communications module 170. As described in further detail herein, the controller 110 can be configured to control other aspects and operations of the system 100 to achieve autonomous aquatic herbicide application.

Figure 5:
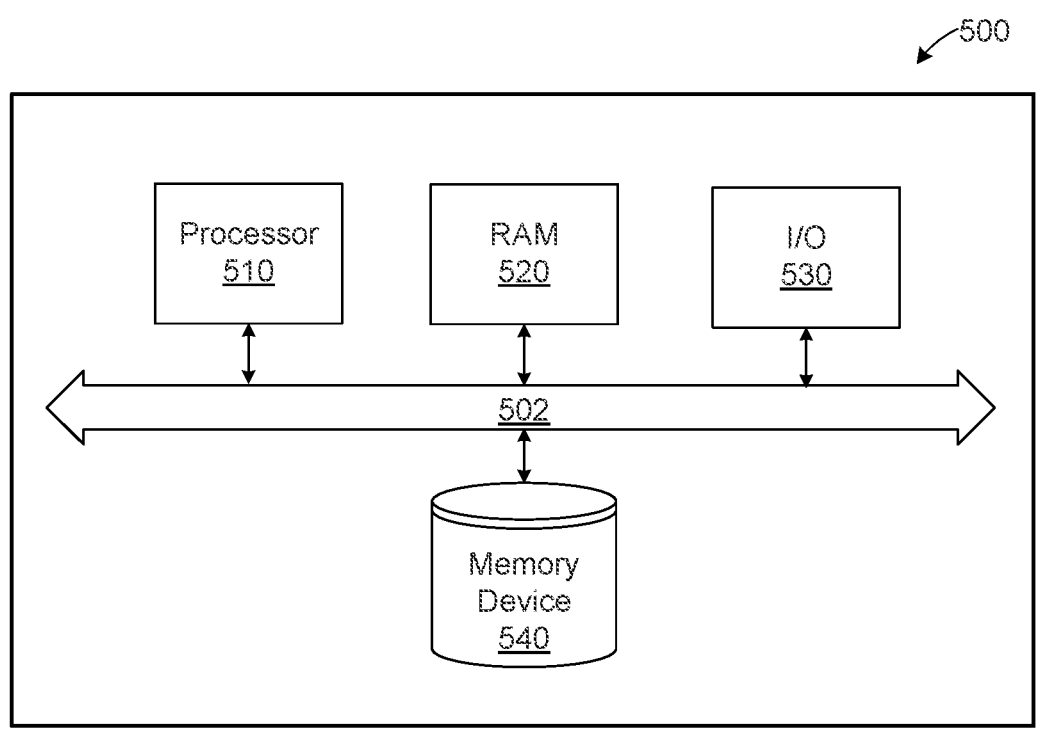
FIG. 5 illustrates an example computing device that can be used in the embodiments described herein.

The data store 162 can be embodied as any suitable type of memory including any of those described below with reference to FIG. 5 and known equivalents thereof. The data store 162 includes route data 164 and survey data 166. As described in further detail below with reference to FIG. 2, the route data 164 can define one or more pre-defined or autonomously-determined routes to be followed by the system 10 during herbicide application. The routes can cover a greater or lesser extent of the body of water 20, depending upon the location and/or density of the aquatic plants 20 and other factors. Similarly, the routes can separately define areas for herbicide application, various or variable concentrations for herbicide application, and other factors related to the application of one or more herbicides at multiple locations. The survey data 166 includes data gathered by the survey platform 190 over time, such as photographs, videos, sonar data, etc. In some cases, the survey data 166 can be wirelessly transmitted to a remote telemetry platform using the communications module 170.

The communications module 170 can be embodied as any suitable physical layer wireless communications device (e.g., WiFi, cellular, etc.) or module along with the associated layers of communications protocols and physical and/or applications interfaces to interface with the control processor 160. Using the communications module 170, the system 10 can receive and transmit data, including remote telemetry data, with a remote telemetry platform. In various embodiments, the system 10 can operate in a fully-autonomous mode, in a semi-autonomous mode with certain control signals being received from the remote telemetry platform through the communications module 170, or in a remote-controlled mode in which the operation of the system 10 is fully directed according to the control signals from the remote telemetry platform.

The positioning system 180 can be embodied as a global positioning system (GPS) receiver. As such, the positioning system 180 is configured to determine the geographic location of the system 10 over time. In various embodiments, depending upon the level of accuracy needed, the positioning system 180 can include one or more antennas positioned at certain locations on the aquatic vessel 100 or on outrigger arms of the aquatic vessel. In some embodiments, the positioning system 180 includes only a single antenna secured to the aquatic vessel 100 at a position known to the controller 110, and the controller 110 is configured to calculate the relative positions of various equipment (e.g., transducers, cameras, etc.) of the system 10.

The survey platform 190 can be embodied as a platform of one or more sensors, transducers, and/or receivers, such as image sensors (e.g., infrared, ultraviolet, and/or visible-light cameras), temperature probes, turbidity meters, conductivity meters, salinity meters, chloride sensors, pH sensors, sonar transducers, or other types of sensors. The survey platform 190 is generally configured to measure the surroundings of the system 10. For example, the sonar transducers of the survey platform 190 can be relied upon to determine the extent of aquatic plant growth in the body of water 20. Similarly, one or more sonar transducers of the survey platform 190 can be relied upon to identify the depth of the body of water 20 at various locations. As another example, one or more cameras of the survey platform 190 can be relied upon to capture still shots or video of aquatic plant growth or detect the extent of the body of water 20 (e.g., identify shorelines).

The control processor 160 can be configured to navigate the system 10 using the propulsion system 140 based on one or more of the route data 164, the location data determined by the positioning system 180, and image and depth data captured by the survey platform 190. The data collected by the survey platform 190 can be stored as the survey data 166 in the data store 162 and/or wirelessly transmitted to the remote telemetry platform using the communications module 170.

The holding container 120 can be embodied as any suitable container for holding a substance. The substance in the holding container 120 can vary depending upon the use case for the system 10. For example, the substance can be a herbicide, pesticide (e.g., mosquitocide, etc.), algaecide, molluscicide, or other substance to control the growth of plants, animals, or insects, among other things. Depending upon the size of the aquatic vessel 100, the size of the body of water 20, and/or the concentration of the substance being stored, the holding container 120 can be larger or smaller among embodiments.

The substance applicator 130 can be embodied as any suitable mechanism or assembly for applying or dispersing the substance held in the holding container 120. For example, if the substance is a liquid aquatic herbicide, the substance applicator 130 can be embodied as one or more motors, pumps, tubes, and dispersing nozzles, such as the dispersing nozzle 132. In various embodiments, nozzles similar to the dispersing nozzle 132 can be positioned at any location outboard the aquatic vessel 100. On the other hand, if the substance is a solid aquatic herbicide, the substance applicator 130 can be embodied as one or more mechanisms, including motors, belts, augers, scoops, tubes, shakers, etc., suitable for dispersing solids. In either case, the substance applicator 130 can apply the substance at the surface level of the body of water 20, below the surface level of the body of water 20, above the surface level of the body of water 20, or any combination thereof. Additionally, the holding container 120 and the substance applicator 130 can be formed as a closed system suitable for the labelling requirements of certain pesticides and/or herbicides.

The controller 110 is coupled to the substance applicator 130 and directs the operation of the substance applicator 130 as described in further detail below. In some embodiments, the substance applicator 130 can be controlled by the controller 110 to apply the substance in the holding container 120 at a certain time or times and a certain rate. The controller 110 can control the substance applicator 130 to apply the substance in the holding container 120 at various rates over time according to a predefined plan stored in the route data 164 and/or real time survey data gathered by the survey platform 190 as described herein.

The propulsion system 140 can be embodied as any suitable system for propelling or moving the system 10. In the embodiment shown in FIG. 1, for example, the propulsion system 140 can include a fan 142 and one or more wind vanes or rudders (not shown) for steering. In other cases, the wind vanes or rudders can be omitted and the fan 142 can be directly rotated directly in the azimuth direction. In that case, the azimuth of the fan 142 can be adjusted using a turntable mechanism under the fan 142 which can include a number of mechanical gears, motors, servos, etc. In still other embodiments, the propulsion system 140 can include an auxiliary bow-positioned blower or fan, an outboard motor having a propeller, a water jet having an impeller, or a similar propulsion system including a rudder, etc., for propulsion and/or steering. In various embodiments, the propulsion system 140 can include one or more electric motors, gasoline engines, or other types of drive systems powered by electricity, gasoline, or other fuels and be capable of propelling the system 10 forward, backward, and from side to side at variable rates of speed. The controller 110 is coupled to the propulsion system 140 and directs the operation of the propulsion system 140 as described in further detail below.

The battery 150 can be embodied as any suitable type and number of batteries to provide energy to the controller 110 (and its subsystems), the substance applicator 130, the propulsion system 140, and other components as needed. In certain embodiments, such as where the propulsion system 140 is embodied using a gasoline engine, the system 10 can also include a separate holding tank for holding liquid fuel, in addition to the battery 150, along with a generator or alternator to generate electric energy.

Turning to FIG. 2, examples of the operation of the system 10 (and similar systems) are described in greater detail. FIG. 2 illustrates a plan view of a route 40 followed in the body of water 20 by the system 10 shown in FIG. 1. In FIG. 2, the remote telemetry platform 210 is also illustrated. The remote telemetry platform 210 can be embodied as one or more computing devices, such as a desktop computer, laptop computer, or other computing device, for example, including a communications module capable of wireless communications with the communications module 170 of the system 10. Thus, the remote telemetry platform 210 can be relied upon for two-way telemetry and control signaling with the system 10.

As shown in FIG. 2, the route 40 is provided by way of example of one route that can be followed by the system 10 in the application of herbicide to the body of water 20. The route 40 is an example of a pre-defined route stored in the route data 164. Although the route 40 is shown in FIG. 2 as covering only a portion of the body of water 20, it should be appreciated that the route 40 can extend to cover substantially all of the body of water 20. In an autonomous mode of operation, the controller 110 is configured to navigate the system 10 over the body of water 20 using the propulsion system 140 based on one or more of the route 40, the positioning data received from the positioning system 180, the survey data received from the survey platform 190, and other relevant factors.

As shown in FIG. 2, the route 40 also includes an application pattern (shown as dashed/dotted lines) having application segments (e.g., the application segment 42). The controller 110 is configured to apply the substance stored in the holding container 120 to the body of water 120 using the substance applicator 130 when the system 10 travels along (e.g., travels proximate to) the application segments. Thus, in some embodiments, the route 40 defines both a path for the system 10 to travel, as well as various application segments, including the application segment 42, that define areas for the application of herbicide or other substance(s). In that context, it should be appreciated that the system 10 is capable of traversing across the body of water 20, along any pre-defined route, and also capable of applying herbicide to specific areas of the body of water 20.

The route 40 can also define certain conditions and/or constraints associated with the application of herbicides. For example, in one embodiment, an application segment of the route 40 can specify the application of herbicides at a certain rate or volume. In other embodiments, an application segment can specify the application of herbicides only when the aquatic vehicle 100 is travelling above or below certain speeds or within a certain range of speeds.

Even when the system 10 is tracking the route 40, the controller 110 can be configured to analyze real-time data captured by the survey platform 190 as an additional factor or feedback to control of the system 10. For example, the image sensors and/or sonar transducers of the survey platform 190 can identify a relatively higher number of aquatic plants in the region 50. In turn, the controller 110 can use that information to apply higher levels of herbicide in the region 50. Alternatively, the controller 110 can use that information to avoid the region 50 and prevent the aquatic vessel 100 from becoming stuck in the aquatic plants in the region 50. In other cases, to the extent that the real-time data captured by the survey platform 190 contradicts or preempts the data in the route 40, the controller 110 can control the system 10 based on the real-time data. Thus, the controller 110 can be capable of controlling the system 10 to avoid obstacles or other situations that may present danger, such as fishermen, driftwood, etc., even if the route 40 fails to account for them.

In other embodiments, a user can operate the remote telemetry platform 210 to wirelessly control the route taken by the system 10 in semi-autonomous and/or remote-controlled modes of operation. Similarly, the user can operate the remote telemetry platform 210 to wirelessly control the application of herbicides by the system 10. In either the semi-autonomous or remote-controlled modes of operation, wireless telemetry data, including image feeds, video feeds, sonar data feeds, etc., can be wirelessly relayed from the system 10 to the remote telemetry platform 210. This wireless telemetry data can be stored and displayed on the remote telemetry platform 210, and a user of the remote telemetry platform 210 can view the data to make decisions as to how and where to navigate the system 10 on the body of water 20, for example, and where to apply herbicides or other substances.

In some cases, the system 10 can operate with other autonomous aquatic herbicide application systems, such as the systems 220 and 230 in FIG. 2. The systems 220 and 230 are similar to the system 10 but can omit certain equipment, such as the survey platform 190. In this scenario, the systems 10, 220, and 230 can operate together as a type of ad-hoc (or other) network of substance application vehicles. In this case, the system 10 can act as a command and/or control system that performs a survey of the body of water 20. For example, the system 10 can survey the conditions on the body of water 20 using the survey platform 190 and calculate herbicide application routes for the systems 220 and 230. Those routes can be wirelessly communicated to the systems 220 and 230. In turn, the systems 220 and 230 can follow the routes over the body of water 20 and apply herbicides, for example, or any other substances according to the routes calculated by the system 10.

Additionally, the systems 220 and 230 can wirelessly communicate control and signaling data between each other and the system 10 to coordinate herbicide application processes among them. Working together, the systems 10, 220, and 230 can apply herbicides or other substances over larger areas in a shorter period of time. Additionally, when the system 10 acts as a command and/or control system, the systems 220 and 230 can be cheaper because they do not need the survey platform 190, for example, or other relatively costly equipment. Instead, all surveying can be performed by the system 10. In other cases, the systems 220 and 230 can include the same or similar components as the system 10.

Figure 3:
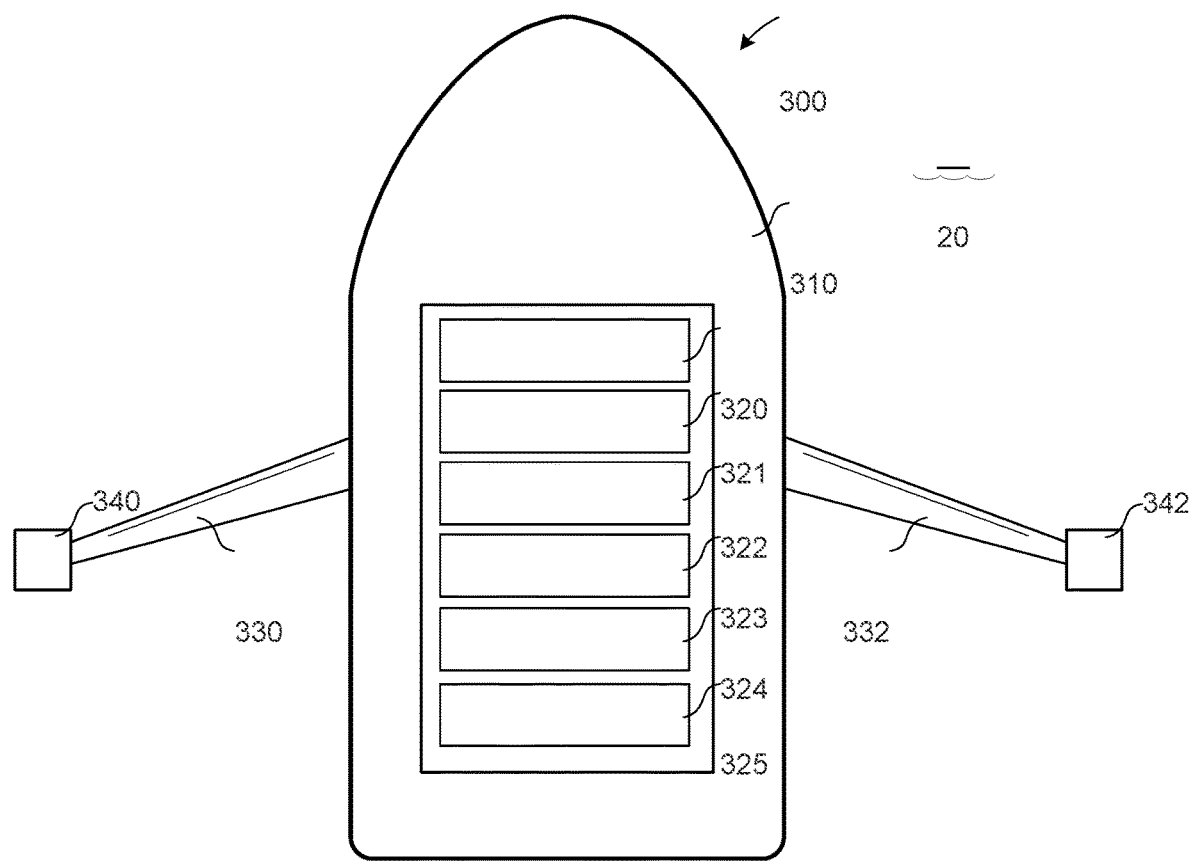
FIG. 3 illustrates another example autonomous aquatic herbicide application system according to an example embodiment described herein.

FIG. 3 illustrates another example autonomous aquatic herbicide application system 300 ("the system 300") according to an example embodiment described herein. Among other components, the system 300 includes an aquatic vessel 310, modular bays 320-325, and an outrigger platform including outrigger arms 330 and 332 having outrigger equipment 340 and 342. The system 300 is similar to the system 10 shown in FIG. 1 (and can include the same or similar equipment as the system 10) but also relies upon the modular bays 320-325 and the outrigger arms 330 and 332.

The modular bays 320-325 can be embodied as a group of bays having one or more standard sizes. In that context, various types of equipment, such as the controller 110, the holding container 120, the substance applicator 130, the battery 150, the survey platform 190, etc., can be contained in one or more modular housing, and the modular housings can be inserted into the modular bays 320-325. In this way, the equipment carried by the system 300 can be changed easily over time by inserting modules into the modular bays 320-325 and/or removing modules from the modular bays 320-325.

The outrigger arms 330 and 332 can facilitate the application of substances to the body of water 20, improve the ability to survey the body of water 20, and improve the ability to apply herbicide or other substances to the body of water 20. In other words, the outrigger arms 330 and 332 can be helpful in various cases to make vegetation management, geolocation and communications functions, bathymetry determination, and vegetation and water chemistry measurement, surveying, and analysis more accurate and/or robust. The outrigger arms 330 and 332 are illustrated in FIG. 3 as one example of outrigger arms that can be relied upon in the embodiments. In other words, although the outrigger arms 330 and 332 are shown in FIG. 3 as extending out a distance from the right and left sides of the aquatic vessel 310, other embodiments can include outrigger arms that extend out other distances from other locations along the periphery of the aquatic vessel 310.

Because the outrigger arms 330 and 332 extend out from the sides of the aquatic vessel 310, the outrigger arms 330 and 332 can be relied upon to effectively increase the size of the system 300 for herbicide application, data collection, etc. In that context, the outrigger equipment 340 and 342 can include propulsion system equipment (e.g., propellers, rudders, etc.), buoys, sensors for survey platforms, nozzles for substance application, antennas for GPS positioning, etc.

In one embodiment, one or both of the outrigger equipment 340 and 342 include a sonar transducer and an antenna for GPS positioning. In that case, data captured by each sonar transducer can be associated with positioning data determined by a separate GPS receiver for increased survey data accuracy. In other cases, the system 300 can include a single antenna for GPS positioning, and the controller 110 can calculate positioning data for each of the sonar transducers in the outrigger equipment 340 and 342. The positioning data can be calculated based on the relative position of the single antenna, the size of the aquatic vessel 310, the relative positions of the outrigger equipment 340 and 342, the length of each of the outrigger arms 330 and 332, etc.

Figure 4:
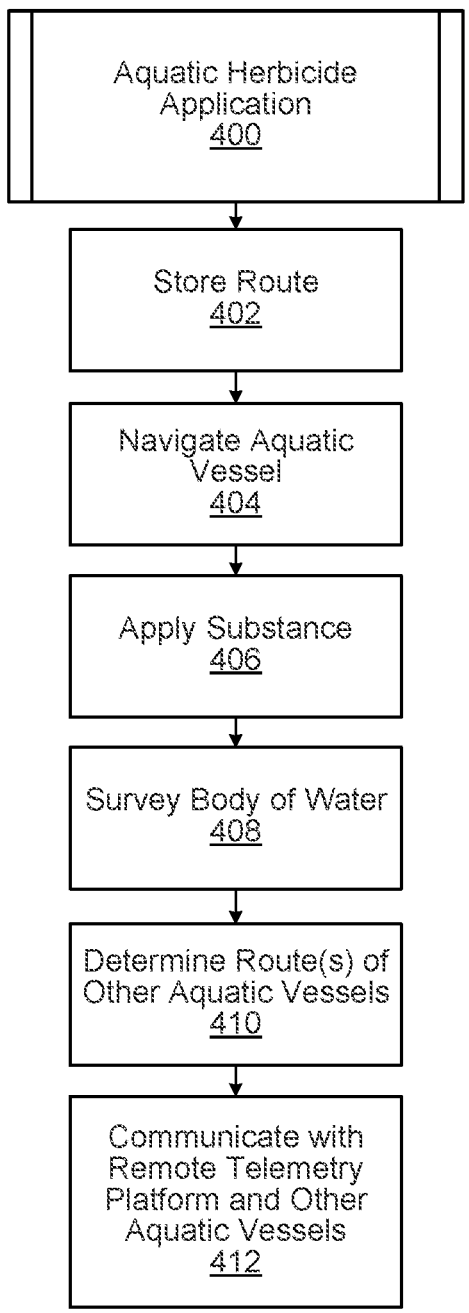
FIG. 4 illustrates an example process for autonomous aquatic herbicide application according to an example embodiment described herein.

Before turning to the process flow diagram of FIGS. 4, it is noted that embodiments described herein may be practiced using an alternative order of the steps illustrated in FIG. 4. That is, the process flow illustrated in FIG. 4 is provided as an example, and the embodiments may be practiced using process flows that differ from that illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope and spirit of the embodiments. Finally, although the process in FIG. 4 is described in connection with the system 10 in FIG. 1, other, similar systems can be relied upon to perform the process.

FIG. 4 illustrates an example process 400 for autonomous aquatic herbicide application according to an example embodiment described herein. At reference numeral 402, the process 400 includes the controller 110 of the system 10 storing a route for the system 10 into the route data 164. Here, the route can be received by the controller 110 over the communications module 170, for example, provided using a memory card inserted into the controller 110, or any other data transfer techniques. It should be appreciated that, in certain cases, the system 10 can operate even without storing a route. In that case, the system 10 can navigate based only on survey data as described herein.

At reference numeral 404, the process 400 includes the system 10 navigating the aquatic vessel 100 according to the route. For example, the controller 110 can direct the propulsion system 140 to steer the aquatic vessel 100 over the body of water 20 according to the route stored at reference numeral 402. More specifically, at reference numeral 404, the process 400 can include the controller 110 determining a geographic location associated with the aquatic vessel 100 using data from the positioning system 180 and controlling the propulsion system 140 to track the route based on changes in the geographic location over time.

At reference numeral 406, the process 400 includes the controller 110 applying a substance to the body of water 20 according to an application pattern associated with the route stored at reference numeral 402. For example, based on one or more application segments defined in the route, the controller 110 can direct the substance applicator 130 to apply a substance, such as an herbicide, to the body of water 20. The application of the substance can be directed based on survey data, positioning data, and other factors described herein.

At reference numeral 408, the process 400 includes the controller 110 surveying the body of water 20 to acquire survey data along the route. The controller 110 can survey the body of water 20 using any of the sensors of the survey platform 190 as described herein. The data collected at reference numeral 408 can be stored as the survey data 166 and communicated to the remote telemetry platform 210 and/or other aquatic vessels (e.g., the systems 220 and 230 in FIG. 2) as described herein.

At reference numeral 410, the process 400 includes the controller 110 determining a route for at least one other aquatic vessel, such as one of the systems 220 and 230 in FIG. 2. Here, the controller 110 can determine the routes for other vessels working to spread substances along with the system 10. In this case, various vessels can work together in a network to speed the application of substances across the body of water 20.

At reference numeral 412, the process 400 includes the controller 110 communicating with the remote telemetry platform 210 and/or other aquatic vessels using the communications module 170. For example, the controller 110 can receive various command and control signals from the remote telemetry platform 210, such as commands to steer or navigate the system 10, commands to apply substances at certain locations, or other commands. The controller 110 can also communicate survey data to the remote telemetry platform 210 and/or routes to other aquatic vessels at reference numeral 412.

It should be appreciated that the processes illustrated in FIG. 4 can continue in an ongoing fashion until a substance is applied to a desired area of the body of water 20, until a survey of the body of water 20 is complete, until the fuel source(s) of the system 10 are exhausted, or until another condition is met. Generally, during the process 400, the system 10 can perform any of the functions described herein. Also the process 400 can be performed in a fully-autonomous, semi-autonomous, or remote-controlled mode.

Turning to FIG. 5, an example hardware diagram of a general purpose computing device 500 is illustrated. One or more of the control processor 160, the communications module 170, the positioning system 180, the survey platform 190, or other equipment in the system 10 can be embodied, in part, using one or more elements of the computing device 500. The computing device 500 includes a processor 510, a Random Access Memory (RAM) 520, an Input/Output (I/O) interface 530, and a memory device 540. The elements of the computing device 500 are communicatively coupled to each other via a local interface 502.

The processor 510 can be embodied as any general purpose arithmetic processor. The RAM 520 can be embodied as any random access or read only memory device that stores computer-readable instructions to be executed by the processor 510. The memory device 540 stores computer-readable instructions thereon that, when executed by the processor 510, direct the processor 510 to execute various aspects of the present invention described herein. As a non-limiting example group, the memory device 540 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The I/O interface 530 can be embodied as any input and/or output interfaces for communications with other system elements. The local interface 502 electrically and communicatively couples the processor 510, the RAM 5, the I/O interface 530, and the memory device 540 to each other, so that data and instructions may be communicated among them.

In operation, the processor 510 is configured to retrieve computer-readable instructions stored on the memory device 540 (or another storage device) and copy the computer-readable instructions to the RAM 520 for execution. The processor 510 is further configured to execute the computer-readable instructions to implement various aspects and features of the present invention. For example, the processor 510 may be adapted and configured to execute the processes described above with reference to FIG. 4.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A system, comprising:

an aquatic vessel comprising:

a propulsion system;

a holding container to hold a substance;

a substance applicator to apply the substance to a body of water;

a controller comprising a control processor and a memory storing a pre-defined route on the body of water comprising a plurality of application segments along the pre-defined route, the controller being configured to navigate the aquatic vessel along the pre-defined route by controlling the propulsion system based at least in part upon a current geographic location associated with the aquatic vessel and subsurface survey data associated with the body of water, and apply the substance to the body of water along designated application segments of the plurality of application segments of the pre-defined route using the substance applicator; and a survey platform comprising at least one transponder to obtain at least a portion of the subsurface survey data, where the controller autonomously adjusts navigation along the pre-defined route to avoid a subsurface region or obstacle in response to the subsurface survey data and autonomously adjusts application of the substance to the body of water by the substance applicator based upon subsurface data identifying aquatic plants.

2. The system of claim 1, wherein the aquatic vessel further comprises:

a global positioning system that provides the current geographic location associated with the aquatic vessel, wherein:

the memory stores the plurality of application segments of the pre-defined route for application of the substance in the body of water; and the controller is further configured to control the propulsion system to track the pre-defined route based on changes in the current geographic location over time.

3. The system of claim 1, wherein the aquatic vessel further comprises:

an outrigger platform comprising at least one outrigger arm; and the survey platform comprises the at least one transponder at a distal end of the at least one outrigger arm.

4. The system of claim 3, wherein the controller is further configured to:

store the subsurface survey data gathered by the survey platform; and apply the substance to the body of water based on the subsurface survey data.

5. The system of claim 1, wherein the controller further comprises a communications module comprising circuitry configured for wireless communications, wherein the controller is further configured to apply the substance to the body of water based on a control signal from a user received through the communications module.

6. The system of claim 1, wherein the aquatic vessel includes a modular bay, and at least one of the holding container, the substance applicator, the controller, or the survey platform is disposed within a modular housing, wherein the modular housing is configured for insertion into and removal from the modular bay.

7. The system of claim 1, wherein the substance comprises an aquatic herbicide.

8. A system, comprising:
- an aquatic vessel comprising a propulsion system;
- a holding container to hold an aquatic herbicide;
- a substance applicator to apply the aquatic herbicide to a body of water;
- a survey platform comprising at least one transponder to obtain subsurface survey data; and
- a controller comprising a control processor and a memory that stores data associated with an application rate for the application of the aquatic herbicide in the body of water, the controller being configured to navigate the aquatic vessel along a pre-defined route by controlling the propulsion system, wherein the controller autonomously adjusts navigation along the pre-defined route to avoid a subsurface region or obstacle in response to the subsurface survey data, and apply the aquatic herbicide to the body of water along the pre-defined route using the substance applicator based on the application rate, and wherein the controller autonomously adjusts application of the aquatic herbicide to the body of water in response to aquatic plants identified based upon the subsurface survey data.

9. The system of claim 8, further comprising:
- a global positioning system that provides a current geographic location associated with the aquatic vessel, wherein:
- the memory further stores a plurality of application segments of the pre-defined route for application of the aquatic herbicide in the body of water; and
- the controller is further configured to control the propulsion system to track the route based on changes in the current geographic location over time.

10. The system of claim 8, wherein the survey platform comprises a transponder at a distal end of an outrigger arm.

11. The system of claim 8, wherein the controller is further configured to apply the aquatic herbicide to the body of water based on the subsurface survey data gathered by the survey platform.

12. The system of claim 8, wherein the controller further comprises a communications module comprising circuitry configured for wireless communications, wherein the controller is further configured to apply the aquatic herbicide to the body of water based on a control signal from a user received through the communications module.

13. The system of claim 8, wherein the aquatic vessel includes a modular bay, and at least one of the holding container, the substance applicator, the controller, or the survey platform is disposed within a modular housing, wherein the modular housing is configured for insertion into and removal from the modular bay.

14. The system of claim 1, wherein the subsurface survey data comprises depth of the body of water.

15. The system of claim 14, wherein the controller is configured to adjust navigation in response to the depth captured by the at least one transponder of the survey platform.

16. The system of claim 1, wherein the controller is configured to adjust navigation in response to real-time subsurface survey data captured by the survey platform.

17. The system of claim 14, wherein the controller is configured to adjust application of the substance in response to real-time subsurface survey data captured by the survey platform.

18. The system of claim 8, wherein the subsurface survey data comprises depth of the body of water.

19. The system of claim 18, wherein the controller is configured to adjust navigation in response to real-time subsurface survey data captured by the survey platform.

20. The system of claim 11, wherein the controller is configured to adjust application of the substance in response to real-time subsurface survey data captured by the survey platform.

* * * * *